United States Patent
Fukunaga

[19]

[11] Patent Number: 5,884,535
[45] Date of Patent: Mar. 23, 1999

[54] POWER TRANSMISSION DEVICE WITH CONTINUOUS SPEED CONTROL

[75] Inventor: Takao Fukunaga, Yawata, Japan

[73] Assignee: Exedy Corporation, Neyagawa, Japan

[21] Appl. No.: 870,590

[22] Filed: Jun. 6, 1997

[30] Foreign Application Priority Data

Jun. 13, 1996 [JP] Japan .................................. 8-152483

[51] Int. Cl.$^6$ .................................................. F16H 47/00
[52] U.S. Cl. ............................................................ 74/730.1
[58] Field of Search ........................................... 74/730.1

[56] References Cited

U.S. PATENT DOCUMENTS

| | | | |
|---|---|---|---|
| 4,773,283 | 9/1988 | Dach et al. | 74/730.1 |
| 5,048,371 | 9/1991 | Hendriks | 74/730.1 |
| 5,253,548 | 10/1993 | Sahashi | 74/730.1 |

OTHER PUBLICATIONS

Design Practices: Passenger Car Automatic Transmissions $3^{rd}$ Edition 1994, SAE, pp. 76–77.

*Primary Examiner*—Dirk Wright
*Attorney, Agent, or Firm*—Shinjyu An Intellectual Property Firm

[57] ABSTRACT

A power transmission device for transmitting a power of a maximum torque of T (kgf-m) from an engine to a device at an output side, having a torque converter (1) and a speed change device (3). The torque converter (1) includes an impeller (5) receiving the power from the engine (E), a turbine (6) opposed to the impeller (5) and a stator (7) disposed between the impeller (5) and the turbine (6), and has a torus of an outer diameter determined in the following range with respect to the engine torque T:

$$D=2.5T+(170 \text{ to } 183)$$

The speed change device (3) has a continuous speed change unit (16) and is operable to transmit an output of the torque converter (1) at a variable speed.

7 Claims, 2 Drawing Sheets

POWER TRANSMISSION DEVICE WITH CONTINUOUS SPEED CONTROL

BACKGROUND OF THE INVENTION

A. Field of the Invention

The present invention relates to a power transmission device, and in particular to a power transmission device having a variable speed changing device including a continuous speed changing unit.

B. Description of the Background Art

Power transmission devices for automobiles may be categorized into a variety of groups. One group of transmission devices includes the combination of a user activated mechanical clutch and a gear train commonly referred to as a standard or manual transmission (MT). Another group of transmission devices includes the combination of an automatic transmission device having a torque converter and a hydraulically controlled gear train. Such an automatic transmission device will be referred to herein after as an "AT" device. Another group of transmission devices includes the combination of an automatic clutch device, which can be one of various kinds of clutches, and a variable speed changing device, such as a continuous speed changing belt-pulley configuration. Such a variable speed changing device will be referred to hereinafter as a "CVT" device (Continuously Variable Transmission).

A CVT device generally is configured to allow for a continuously variable speed ratio, where the ratio of an engine's output rotation speed to the output of the transmission device is continuously variable. Such CVT devices usually include belts which have a large torque transmission capacity.

In a power transmission device provided with the CVT device, an engine is coupled to the CVT device by an automatic clutch device such as an electromagnetic clutch. However, the automatic clutch device such as an electromagnetic clutch has disadvantages, and for example, it will not allow a vehicle to creep forward at an extremely slow speed. The sudden engagement of electromagnetic clutches precludes the possibility of a vehicle creeping forward. In order to improve driving characteristics of the vehicle, a CVT device is combined with a torque converter in some cases.

CVT devices are often used in small cars where space is at a premium. Therefore, it is important to minimize the space taken by all components of the drive train. A problem with torque converters used with CVT devices is that the torque converter is large and takes up a fair amount of space.

Further, when the torque converter is combined with the CVT device, the capacity of the torque converter is often considered and determined in a manner similar to torque converters used with an AT device. In determining the capacity of a torque converter, a required capacity coefficient C is calculated based upon torque characteristics of the engine so that performance of the engine may be maximized. The capacity coefficient C represents the toque which can be inputted into the torque converter at a certain rotational speed, and is expressed as follows:

$$C=Ti/Ni^2$$

where Ti represents an input torque, and Ni represents an input rotation speed. The capacity coefficient C is proportional to the outer diameter of a torus, the torus being defined by, for instance, the turbine of the torque converter. The capacity coefficient C is proportional to the outer diameter D of the torus to the fifth power. The capacity coefficient C may also be expressed as follows:

$$C=Ti/Ni^2=K \cdot D^5$$

where K is a coefficient depending on a type and a structure of the torque converter as well as properties of fluid and the speed ratio of input to output of the torque converter. Based on the above relationships, the size of the torque converter is generally determined from an estimated value of the outer diameter of the torus (the outer diameter of the turbine of the torque converter).

A CVT device is typically smaller than an AT device having a similar capacity. Even so, it is desirable to reduce the size of the torque converter used with the CVT device.

SUMMARY OF THE INVENTION

One object of the invention is provide a power transmission device having the combination of a CVT device and a torque converter with a torque converter having a minimized size.

Another object of the invention is provide a means for determining a minimal sized torque converter for a power transmission device having the combination of a CVT device where the CVT device has a capacity similar to that of an AT device but where the torque converter in the CVT device is smaller that the torque converter in the AT device.

Basic principles of torque converters will now be described below in order to provide a better understanding of the significance of the present invention.

An AT device and a CVT device differ from each other in range or width of a speed changing ratio, where the speed changing ratio is defined as the ratio of the engine output speed verses the power transmission device output speed. The range of the speed changing ratio of a CVT is larger that the range of the speed changing ratio of an AT device. Therefore, if the size of the torque converter used in the CVT device is determined based upon the criteria used to determine the size of the torque converter used in an AT device (for instance, use the capacity coefficient C described above) then the torque converter in the CVT will be unnecessarily large size. as is explained below.

The following is an example of a speed changing ratio of a typical AT device:

Maximum speed changing ratio (1st gear)=2.840, and

Minimum speed changing ratio (4th gear)=0.697

The following is an example of a speed change ratio of a general CVT device:

Maximum speed change ratio=2.503, and

Minimum speed change ratio=0.497

From the foregoing, width of the speed changing ratios can be obtained as follows:

Width of the speed change ratio of AT device=2.840/0.697=4.075

Width of the speed change ratio width of CVT device=2.503/0.497=5.036

As shown in the equations above, the width of the speed changing ratio of a CVT device is generally larger that the width of the speed change ratio of the AT device.

When consideration is given to a stall torque ratio which is a typical factor representing performance of a torque converter, a stall torque ratio of the torque converter used with the AT device is generally in a range from 2.0 to 2.2. When a traction force of a vehicle equipped with the AT device is desired to be equal to that of a vehicle equipped with the CVT device, the stall torque ratio of the torque converter used with the CVT device can be smaller than that of the torque converter used with the AT device because of the differences in the width of the above described speed changing ratios.

Thus, the stall torque ratio of the torque converter combined with the CVT device can be determined as follows:

(Stall torque ratio)×Width (AT)/Width (CVT)=(2.0 to 2.3)×4.075/ 5.036=1.6 to 1.8

Thereby, the power transmission device can have a performance similar to that provided by the AT device.

Although specific numerical values have been discussed in connection with the above example, the stall torque ratio of the CVT device may be 20% to 25% lower than that of an AT device having a similar torque transmitting capacity.

An output shaft torque coefficient To is defined as an output shaft torque divided by the square of a rotation speed. To can be expressed as follows:

To=Cs×ts where Cs is a capacity coefficient at the time of stall, and ts is a torque ratio at the time of stall. Therefore, when the output shaft torque coefficients To (corresponding to the traction forces) of both the AT and CVT devices are equal to each other, the fact that the stall torque ratio can be reduced by 20% to 25% means that the capacity coefficient Cs can be increased by 20% to 25%. Also, the input shaft torque coefficient Ti (obtained by dividing the input shaft torque by a square of the rotation speed) can be expressed as follows:

Ti=Cs×D$^5$ where D represents a torque converter size (outer diameter of a torus). Therefore, assuming that the torque converter for the AT device has a torque converter size of Da and the torque converter for the CVT device has a torque converter size of Dc, the following relationship is established when both of them are coupled to the engines of the same performance.

(1.20 to 1.25)Cs×Dc$^5$=Cs×Da$^5$ and therefore,

Dc={Da$^5$/(1.20 to 1.25)}$^{(1/5)}$

The foregoing can be expressed in relationships of engine torque T (kgf-m) with respect to Da (mm) and Dc (mm).

Da=2.5T+(185 to 198)

Dc=2.5T+(170 to 183)

In accordance with one aspect of the present invention, a power transmission device for transmitting a maximum torque T (kgf-m) from an engine to an output member, includes a torque converter having an impeller, a stator and a turbine, the impeller receiving the power from the engine, the turbine defining a torus having an outer diameter D, D being in a range:

D=2.5T+(170 to 183);

where T is torque from the engine.

The power transmission device also includes a speed changing device having a continuously variable speed changing unit and being operable to transmit an output therefrom at a variable speeds.

Preferably, a ratio between a minimum speed change ratio and a maximum speed change ratio of the continuous speed changing unit is at least 5.

Preferably, the continuously variable speed changing unit comprises a first variable diameter pulley assembly and a second variable diameter pulley assembly and a belt extending between the first and second variable diameter pulley assemblies.

Preferably, the torque converter has a stall torque ratio in a range from 1.6 to 1.8.

In accordance with another aspect of the present invention, a power transmission device for transmitting power from an engine to an output member, includes a torque converter having an impeller, a stator and a turbine, the impeller receiving the power from the engine, the torque converter having a stall torque ratio in a range from 1.6 to 1.8. The power transmission device also includes a speed changing device having a continuously variable speed changing unit and being operable to transmit an output therefrom at a variable speeds.

Preferably, a ratio between a minimum speed change ratio and a maximum speed change ratio of the continuous speed changing unit is at least 5.

Preferably, the continuously variable speed changing unit comprises a first variable diameter pulley assembly and a second variable diameter pulley assembly and a belt extending between the first and second variable diameter pulley assemblies.

Preferably, the turbine defines a torus having an outer diameter D, D being in a range:

D=2.5T+(170 to 183);

where T is torque from the engine.

In the present invention, the speed changing device having the continuous speed change unit can be supplied with the power from the torque converter having a sufficient torque transmission capacity and a minimized size. Consequently, the whole transmission device can have a reduced size and weight due to the minimized size of the torque converter as well as having the speed change device employing the continuous speed changing unit.

The above transmission device uses the continuous speed change unit, and has the stall torque ratio in a range from 1.6 to 1.8, which is smaller than that of the stall torque ratio of the torque converter generally used in a vehicle together with an AT device. Therefore, the capacity coefficient can be high, and therefore the torque converter can have reduced sizes and weight compared with the torque converter to be combined with an AT device and coupled to an engine having the same torque performance.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
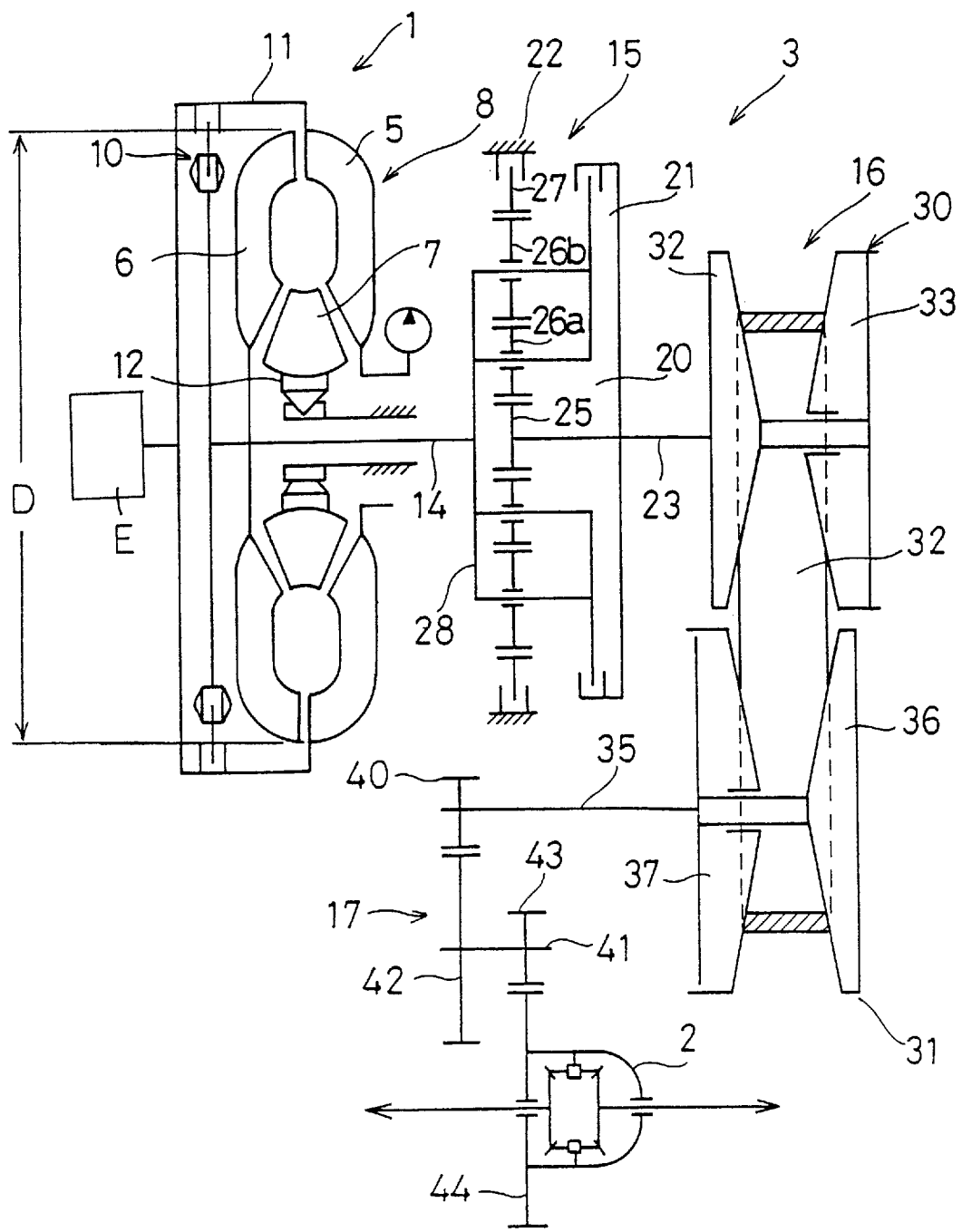
FIG. 1 is a schematic side view showing a power transmission device in accordance with one embodiment of the present invention.

FIG. 1 schematically shows a power transmission device in accordance with one embodiment of the present invention.

The power transmission device includes a torque converter 1 coupled to an engine E, and a speed changing device 3 for transmitting an output of the torque converter 1 to a differential gear 2.

The torque converter 1 includes a torque converter unit 8, which is formed with an impeller 5, a turbine 6 and a stator 7, and is operable to transmit a power through a working fluid. The torque converter 1 also includes a lockup clutch device 10 for directly transmitting the power from the engine to the speed change device 3.

The impeller 5 is coupled to a front cover 11 which is in turn connected to engine E to receive torque therefrom. The turbine 6 is opposed to the impeller 5, and receives the power from the impeller 5 through the working fluid. The stator 7 is disposed between the impeller 5 and the turbine 6, and is supported in the torque converter 1 by a one-way clutch 12.

The speed change device 3 has an input shaft 14, a clutch unit 15 connected to the input shaft 14, a continuous speed change unit 16 and an output gear train 17.

The clutch unit 15 includes a planetary gear train 20, a forward driving clutch 21, a reverse driving clutch 22 and a driven or output shaft 23. The planetary gear train 20 has a sun gear 25 coupled to the output shaft 23, first planetary gears 26a meshing with the sun gear 25, second planetary gears 26b meshing with the first planetary gears 26a and a ring gear 27 meshing with the planetary gears 26b. The first and second planetary gears 26a and 26b are carried by a carrier 28 coupled to the input shaft 14. The forward driving clutch 21 is operable to couple and release the carrier 28 with respect to the output shaft 23. The reverse driving clutch 22 is operable to allow and inhibit rotation of the ring gear 27. The clutch unit 15 is configured to selectively reverse the rotational direction of the torque received from the shaft 14, as is explained in further detail below.

The continuous speed change unit 16 has an input pulley device 30, an output pulley device 31 and a belt 32 coupling both the pulley devices 30 and 31 together. The input pulley device 30 has a stationary pulley 32 fixed to the drive shaft 23, and a movable pulley 33 which is movable toward and away from the stationary pulley 32. The output pulley device 31 has a stationary pulley 36 fixed to the output shaft 35, and a movable pulley 37 which is movable toward and away from the stationary pulley 36. In this continuous speed change unit 16, a width between the minimum and maximum speed change ratios can be pre-set to 5 or more by predetermined movement of the movable pulleys 33 and 37. Although not shown, the pulleys 33 and 37 may be biased against movement in predetermined directions by either spring mechanisms, hydraulic actuators or the like.

The output gear train 17 has an output gear 40 fixed to the output shaft 35 as well as first and second intermediate gears 42 and 43 which are fixed to a counter shaft 41. The first intermediate gear 42 is meshed with the output gear 40, and the second intermediate gear 43 is in mesh with an input gear 44 of the differential gear 2.

In the power transmission device described above, a torus of the torque converter unit 1 has an outer diameter D (mm) which has a relationship expressed by the following formula with respect to the maximum torque T (kgf-m) of the engine coupled to this power transmission device.

$$D = 2.5T + (170 \text{ to } 183) \qquad (1)$$

This torque converter unit 1 uses a stall torque ratio from 1.6 to 1.8.

Figure 2:
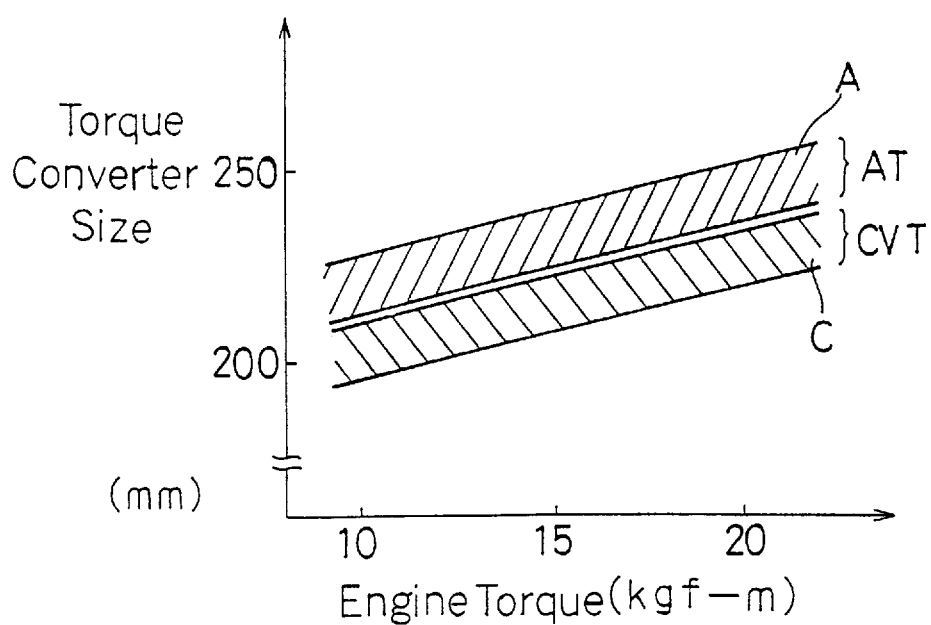
FIG. 2 is a graph showing the relationship between an engine torque and torque converter size for both an automatic transmission (AT) and a variable speed changing device (CVT).

The torus outer diameter D (mm) is smaller than the size of the conventional torque converter for the AT device having generally the same power transmission capacity. The relationship is shown in FIG. 2. As shown in FIG. 2, the conventional torque converter for an AT device has a size which is determined to be in a range represented by a region A. This can be substantially expressed by the following general formula:

$$D = 2.5T + (185 \text{ to } 198) \qquad (2)$$

Meanwhile, the torque converter for the CVT device has the size which is generally expressed by the foregoing formula (1), and is in a range represented by a region C in FIG. 2.

As described above, the size of the torque converter for the CVT device can be smaller than that of the torque converter for the AT device for the following reason. As already described, the speed change ratio width of the CVT device is generally 5 or more and is wider than that for the AT device. When the traction force of the vehicle equipped with the CVT device is to be equal to that of the vehicle equipped with the AT device, the stall torque ratio can be reduced owing to the large width of the speed change ratio.

Therefore, the stall torque ratio of the torque converter of the CVT device can be in a range from 1.6 to 1.8, and the size thereof can be reduced as already described.

Comparison will now be made based on, e.g., the following specific numerical values.

(1) For an engine torque (maximum torque) of 12 kgf-m, the torque converter for the AT device generally has a torus diameter from 215 to 235 mm (from 215 to 228 mm when calculated from the formula (2)). Meanwhile, the torque converter for the CVT device, which has a torus diameter from 200 to 215 mm (from 200 to 213 mm when calculated from the formula (1)), may be used to achieve a performance similar to that of the combination of the AT device and the torque converter having the torus diameter from 215 to 235 mm.

(2) For an engine torque of 18 kgf-m, the torque converter for the AT device generally has a torus diameter from 230 to 245 mm (from 230 to 243 when calculated from the formula (2)). Meanwhile, the torque converter for the CVT device, which has a torus diameter from 215 to 230 mm (from 215 to 228 mm when calculated from the formula (1)), may be used to achieve a performance similar to that of the combination of the AT device and the torque converter having the torus diameter from 230 to 245 mm.

According to the invention, as described above, the power transmission device including the speed change device having the continuous speed change unit can employ the torque converter of the sizes smaller than that of the conventional torque converter for the AT device, and therefore the transmission device can have reduced sizes and weight as a whole.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A power transmission device for transmitting a maximum torque T (kgf-m) from an engine to an output member, comprising:

a torque converter having an impeller, a stator and a turbine, said impeller receiving the power from the engine, said turbine defining a torus having an outer diameter D, D being in a range:

$$D=2.5T+(170 \text{ to } 183);$$

where T is torque from the engine; and a speed changing device having a continuously variable speed changing unit and being operable to transmit an output therefrom at a variable speeds.

2. The power transmission device according to claim 1, wherein a ratio between a minimum speed change ratio and a maximum speed change ratio of said continuous speed changing unit is at least 5.

3. The power transmission device according to claim 1, wherein said continuously variable speed changing unit comprises a first variable diameter pulley assembly and a second variable diameter pulley assembly and a belt extending between said first and second variable diameter pulley assemblies.

4. The power transmission device according to claim 1, wherein said torque converter has a stall torque ratio in a range from 1.6 to 1.8.

5. A power transmission device for transmitting power from an engine to an output member, comprising:

a torque converter having an impeller, a stator and a turbine, said impeller receiving the power from the engine, said torque converter having a stall torque ratio in a range from 1.6 to 1.8;

a speed changing device having a continuously variable speed changing unit and being operable to transmit an output therefrom at a variable speeds; and wherein said turbine defines a torus having an outer diameter D, D being in a range:

$$D=2.5T+(170 \text{ to } 183);$$

where T is torque from the engine.

6. The power transmission device according to claim 5, wherein a ratio between a minimum speed change ratio and a maximum speed change ratio of said continuous speed changing unit is at least 5.

7. The power transmission device according to claim 5, wherein said continuously variable speed changing unit comprises a first variable diameter pulley assembly and a second variable diameter pulley assembly and a belt extending between said first and second variable diameter pulley assemblies.

* * * * *